United States Patent Office 3,642,753
Patented Feb. 15, 1972

3,642,753
PROCESS FOR THE PREPARATION OF POLYPERFLUOROCYCLOBUTENE
Richard W. Anderson and Hughie R. Frick, Midland, Mich., assignors to The Dow Chemical Company, Midland, Mich.
No Drawing. Filed Nov. 14, 1969, Ser. No. 876,997
Int. Cl. C08f 3/20
U.S. Cl. 260—91.5                                           10 Claims

ABSTRACT OF THE DISCLOSURE

Disclosed is a process for the preparation of polyperfluorocyclobutene corresponding to the formula:

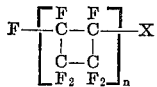

wherein $n$ is a number greater than 1 representing the average degree of polymerization. The process involves reacting polyperfluorocyclobutadiene corresponding to the formula:

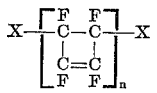

wherein X is halogen and $n$ is as defined above with $CoF_3$, $PbF_4$, $SbF_5$, $AgF_2$, $MnF_3$, $CeF_4$, $BiF_5$, $ClF_3$, $BrF_3$, or $IF_7$. The reaction is carried out at a temperature greater than 100° C. when $CoF_3$, $PbF_4$, $SbF_5$, $AgF_2$, $MnF_3$, $CeF_4$, or $BiF_5$ is the fluorinating agent.

---

The invention disclosed herein was made in the course of or under a contract or subcontract thereunder with The Department of the Navy.

Polyperfluorocyclobutene is a composition having utility for the preparation of thermally stable and chemically inert ablatives, gaskets, bearings and sealants. The industrial application of this polymer may be limited; however, due to the difficulty in the polymerization of fluorine containing olefins to yield polymers of desired molecular weights. In certain instances, highly specialized techniques such as the use of very high pressure and elevated temperature, as well as initiators or chain transfer agents are necessary for preparation of polymers of perfluorocyclobutene. Thus, Brown and Wall report in American Chemical Society Division Polymer Chemical Preprints, 5,907 (1964) that perfluorocyclobutene polymerizes very slowly below 100° and 11,500 atmospheres but that the polymerization becomes extremely rapid at 140° and greater than 12,000 atmospheres pressure.

It is an object of the present invention to provide a novel process for the preparation of polyperfluorocyclobutene. It is an additional object to provide such a process which may be carried out at relatively low pressures and mildly elevated temperatures.

The process of the present invention involves the preparation of polyperfluorocyclobutene corresponding to the formula:

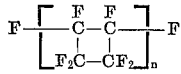

wherein $n$ is a number greater than 1 representing the average degree of polymerization by contacting polyperfluorocyclobutadiene corresponding to the formula:

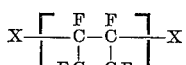

wherein X is halogen and $n$ is as defined above, with $CoF_3$, $PbF_4$, $SbF_5$, $AgF_2$, $MnF_3$, $CeF_4$, $BiF_5$, $ClF_3$, $BrF_3$, or $IF_7$. A reaction temperature of greater than about 100° C. is necessary when $CoF_3$, $PbF_4$, $SbF_5$, $AgF_2$, $MnF_3$, $CeF_4$ or $BiF_5$ is the fluorinating agent. Elevated reaction temperatures are not necessary when $ClF_3$, $BrF_3$ or $IF_7$ is used as fluorinating agent. When the polyperfluorocyclobutadiene has a terminal halogen other than fluorine, the halogen will be replaced by the fluorine of the fluorinating agent to yield a completely fluorinated polymer.

The low molecular weight polyperfluorocyclobutadienes, i.e., $n$ is 2 to about 5, are liquids and may be contacted directly with the fluorinating agent. Normally, however, the reaction is carried out in a solvent. Among the criteria for the choice of solvents to be employed are that they be liquid under the reaction conditions and inert to both the reactants and products, and that they exhibit appreciable solubility for the reactants. Halocarbons such as 1,1,2-trifluoro-1,2,2-trichloroethane, 1,1,2,2-tetrachloro-1-fluoroethane, 1,2,2,2-tetrachloro-1-fluoroethane, or 1,1,2-trichloro-2,2-difluoroethane are useful solvents. The reactants are preferably combined under an inert anhydrous atmosphere.

For complete fluorination of the double bonds the ratio of reactants should be such that at least two available atoms of fluorine, from the fluorinating agent, are provided for each double bond to be fluorinated, i.e., the ratio of available fluorine atoms to $n$ is at least about 2:1. Two available fluorine atoms are provided by each molecule of $SbF_5$, $PbF_4$, and $ClF_3$ whereas $CoF_3$, $CeF_4$, and $AgF_2$ provide only one available fluorine. In order for complete fluorination of the double bonds to take place, the molecular ratio of fluorinating agent to $n$ should be at least 2:1 for those agents which provide only 1 available fluorine atom and 1:1 for those agents which provide two fluorine atoms. An excess of fluorinating agent may be used.

At a reaction temperature of less than about 150° C., rather long reaction periods are required for substantial fluorination with a metallic fluoride as fluorinating agent. At temperatures above about 300° C., some pyrolysis of the organic reactants may occur. Accordingly, a reaction temperature within the range of from about 150° C. to 300° C. is preferred. The polyfluoro halogens, i.e., $ClF_3$, $BrF_3$ and $IF_7$, cause fluorination of the double bonds at substantially lower temperatures than do the metal fluorides. When a polyfluoro halogen is used as fluorinating agent, a reaction temperature of from the freezing point of the system to a maximum of about 50° C. is preferred. Substantially complete fluorination takes place in from about 1 to 7 hours at temperatures within the preferred range.

Due to its relatively easy and economical preparation, cobalt trifluoride is the preferred fluorinating agent.

The polyperfluorocyclobutadiene starting material is prepared by the polymerization of perfluoro-3,4-dihalocyclobutene of formula:

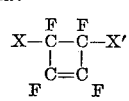

where X' is iodine or bromine and X is halogen. Polymerization is accomplished by contacting the monomer with mercury in the presence of ultraviolet light, usually at a temperature of from 50° to 150° C. When X is chlorine or fluorine the dimer forms. A high polymer is prepared when X is bromine or iodine. Under optimum reaction conditions, degrees of polymerization of 10,000 and greater may be achieved. Polymers having degrees of polymerization of up to about 50 are readily prepared. The polyperfluorocyclobutene prepared by the process of the instant invention will have the degree of polymerization of the polyperfluorocyclobutadiene from which it is derived since the fluorine adds at the double bonds and does not degrade the polymer backbone.

The preparation of the perfluoro-3,4-dihalocyclobutene monomer necessary for preparation of the polyperfluorocyclobutadiene starting material is represented by the following equations:

(1) $CFCl_2CFClCFClCFCl_2 \xrightarrow[EtOH]{Zn} CFCl=CFCF=CFCl$ (2) $CFCl=CFCF=CFCl \xrightarrow[15\ m.m.]{500°\ C}$ 

(3) 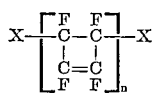 $+ NaI \xrightarrow{anhyd.\ acetone}$ (products as shown)

The following examples will serve to further illustrate the invention:

EXAMPLES

About 3.0 gm. of iodine terminated polyperfluorocyclobutadiene corresponding to the formula:

$$I-\left[\begin{array}{c}F\ \ F\\ C-C\\ |\ \ |\\ C=C\\ F\ \ F\end{array}\right]_{10}-I$$

was prepared by reacting perfluoro-3,4-diiodocyclobutene with mercury in the presence of ultraviolet light. The solid polymer was dissolved in 20 ml. of 1,1,2-trifluoro-1,2,2-trichloro ethane. The resulting solution was added to a 35 ml. stainless steel cylinder containing 19.7 gm. (0.170 mole) of freshly prepared cobalt trifluoride in a nitrogen filled dry box. The cylinder was sealed and placed into a 200° C. oil bath for 7 hours. At the end of the reaction period, the polymer was extracted with additional 1,1,2-trifluoro-1,2,2-trichloroethane and the extract filtered to remove cobalt difluoride and excess cobalt trifluoride. This extract was washed with aqueous sodium iodide to remove any mercuric iodide that may have remained from the original polymerization. Evaporation of the solvent yielded 2.5 gm. of clear polymer, which was a viscous liquid. Infrared analysis indicated that the polymer was free of double bonds. Elemental analysis indicated a carbon to fluorine ratio of 2:3 which is the theoretical ratio for completely fluorinated polyperfluorocyclobutene.

In a manner similar to the procedure described above, the polymer was treated with cobalt trifluoride at 100° C. for 23 hours. Analysis of the product indicated that 92% of the terminal iodine was replaced by fluorine. An infrared spectrum of the product did not indicate fluorination of the double bond.

We claim:

1. A process for the preparation of polyperfluorocyclobutene corresponding to the formula:

$$F-\left[\begin{array}{c}F\ \ F\\ C-C\\ |\ \ |\\ C-C\\ F_2\ F_2\end{array}\right]_n-F$$

wherein $n$ is a number greater than 1 which comprises reacting polyperfluorocyclobutadiene corresponding to the formula:

$$X-\left[\begin{array}{c}F\ \ F\\ C-C\\ |\ \ |\\ C=C\\ F\ \ F\end{array}\right]_n-X$$

wherein X is halogen and $n$ is as defined above with $CoF_3$, $PbF_4$, $SbF_5$, $AgF_2$, $MnF_3$, $CeF_4$, $BiF_5$, $ClF_3$, $BrF_3$ or $IF_7$ as fluorinating agent, said process being further defined in that the reaction is carried out at a temperature greater than about 100° C. when the fluorinating agent is $CoF_3$, $PbF_4$, $SbF_5$, $AgF_2$, $MnF_3$, $CeF_4$ or $BiF_5$.

2. The process of claim 1 wherein the fluorinating agent is $ClF_3$, $BrF_3$ or $IF_7$ and the reaction is carried out at a temperature of from the freezing point of the system to a maximum of about 50° C.

3. The process of claim 1 wherein $n$ is a number of from 2 to about 10,000.

4. The process of claim 1 wherein $n$ is a number of from 2 to 50.

5. The process of claim 1 wherein the fluorinating agent is $PbF_4$, $SbF_5$, $AgF_2$, $MnF_3$, $CeF_4$ or $BiF_5$ and the reaction temperature is within the range of from about 150° to 300° C.

6. The process of claim 1 wherein X is iodine.

7. The process of claim 1 wherein the ratio of available fluorine atoms to $n$ is at least 2:1.

8. The process of claim 1 wherein the fluorinating agent is $CoF_3$ and the reaction temperature is within the range of from about 150° to 300° C.

9. The process of claim 1 wherein the molecular ratio of $CoF_3$ to $n$ is at least 2:1.

10. The process of claim 1 wherein the reaction is carried out in a solvent which is liquid under the reaction conditions, inert to both the reactants and the products and exhibits appreciable solubility for the reactants.

References Cited

UNITED STATES PATENTS

| | | | |
|---|---|---|---|
| 2,436,142 | 2/1948 | Harmon | 260—91.5 |
| 2,837,505 | 6/1958 | Dittman et al. | 260—91.5 |
| 3,058,966 | 10/1962 | Seelbach et al. | 260—91.5 |

HARRY WONG, Jr., Primary Examiner

U.S. Cl. X.R.

204—159.22; 260—33.8, 648 F